United States Patent
Kagimura et al.

(10) Patent No.: US 9,564,797 B2
(45) Date of Patent: Feb. 7, 2017

(54) INDIRECT MATRIX CONVERTER

(71) Applicant: DAIKIN INDUSTRIES, LTD., Osaka-shi, Osaka (JP)

(72) Inventors: Sumio Kagimura, Sakai (JP); Toshiaki Satou, Kusatsu (JP); Shinichi Ishizeki, Sakai (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 14/382,241

(22) PCT Filed: Jan. 23, 2013

(86) PCT No.: PCT/JP2013/051297
§ 371 (c)(1),
(2) Date: Aug. 29, 2014

(87) PCT Pub. No.: WO2013/128982
PCT Pub. Date: Sep. 6, 2013

(65) Prior Publication Data
US 2015/0049526 A1    Feb. 19, 2015

(30) Foreign Application Priority Data
Mar. 2, 2012    (JP) .................. 2012-046132

(51) Int. Cl.
*H02M 5/45* (2006.01)
*H02M 1/34* (2007.01)
(Continued)

(52) U.S. Cl.
CPC ............. *H02M 1/34* (2013.01); *H02M 5/4585* (2013.01); *H02M 2001/0009* (2013.01); *H02M 2001/346* (2013.01); *Y02B 70/1491* (2013.01)

(58) Field of Classification Search
CPC .......... H02M 7/12; H02M 7/48; H02M 7/797; H02M 5/45; H02M 5/4585; H02M 5/458; H02M 5/4505; H02M 5/447; H02M 5/005; H02M 7/7575; H02M 7/268; H02M 1/34
(Continued)

(56) References Cited

U.S. PATENT DOCUMENTS 4,331,994 A * 5/1982 Wirth .................. H02H 3/445
361/100
4,788,485 A    11/1988 Kawagishi et al.
(Continued)

FOREIGN PATENT DOCUMENTS

JP    62-138059 A    6/1987
JP    62-221897 A    9/1987
(Continued)

OTHER PUBLICATIONS

Blaabjerg, et al. "A New Low-Cost, Fully Fault-Protected PWM-VSI Inverter with True Phase-Current Information"; IEEE Transactions on Power Electronics; vol. 12, No. 1, Jan. 1, 1997; XP011043007; ISSN: 0885-8993; pp. 187-197.

*Primary Examiner* — Timothy J Dole
*Assistant Examiner* — Kevin H Sprenger
(74) *Attorney, Agent, or Firm* — Birch, Stewart, Kolasch & Birch, LLP (57) ABSTRACT

A converter receives input of an AC voltage, converts the AC voltage into a DC voltage, and applies the DC voltage between a first power line on a positive electrode side and a second power line on a negative electrode side. A snubber circuit has a capacitor provided between the first and the second power lines, and a diode connected in series with the capacitor between the first and the second power lines, and including an anode on a side close to the first power line on the positive electrode side in a series path with the capacitor. An inverter converts the DC voltage into an AC voltage, and applies the AC voltage to an inductive load. An inverter-side
(Continued)

current detection unit detects a current that flows through the first power line on the positive electrode side or the second power line on the negative electrode side between the inverter and the snubber circuit.

4 Claims, 4 Drawing Sheets (51) Int. Cl.
*H02M 5/458* (2006.01)
*H02M 1/00* (2006.01)

(58) Field of Classification Search
USPC .......................... 363/34–37, 50–53,
55–56.05,363/56.09–56.12, 95, 97–98,
123–127, 131–132
See application file for complete search history.

(56) References Cited

U.S. PATENT DOCUMENTS

| 4,928,052 | A | * | 5/1990 | Fujioka et al. ............... 318/762 |
| 4,973,896 | A | * | 11/1990 | Shiga ................... H02J 7/1438 290/40 C |
| 5,808,882 | A | * | 9/1998 | Mochikawa ............ H02M 1/12 363/126 |
| 5,933,342 | A | * | 8/1999 | Callanan ................. H02M 7/06 363/126 |
| 6,055,161 | A | * | 4/2000 | Church .................... H02M 1/34 363/22 |
| 6,058,031 | A | * | 5/2000 | Lyons ................... H02M 7/487 363/132 |
| 7,633,249 | B2 | | 12/2009 | Sekimoto et al. |
| 2003/0079486 | A1 | * | 5/2003 | Kato ..................... H02M 1/126 62/215 |
| 2006/0044848 | A1 | | 3/2006 | Suzuki et al. |
| 2007/0217235 | A1 | * | 9/2007 | Quazi ................... H02M 1/425 363/89 |
| 2011/0134663 | A1 | * | 6/2011 | Sakakibara ..................... 363/37 |
| 2012/0063178 | A1 | * | 3/2012 | Fujita ................. H02M 5/4585 363/37 |

FOREIGN PATENT DOCUMENTS

| JP | 2001-190060 A | 7/2001 |
| JP | 2004-135440 A | 4/2004 |
| JP | 2006-81261 A | 3/2006 |
| JP | 2009-72022 A | 4/2009 |
| JP | 2011-15604 A | 1/2011 |

* cited by examiner

INDIRECT MATRIX CONVERTER

TECHNICAL FIELD

The present invention relates to an indirect matrix converter, and more particularly to the detection of a current that flows through a DC link.

BACKGROUND ART

In an indirect matrix converter, for example, a current source converter having reverse blocking, and a voltage source inverter are connected to each other through a DC link. In such an indirect matrix converter, a clamp circuit is provided in the DC link in order to absorb a regenerative current from the inverter. The clamp circuit has the same configuration as, for example, a DC snubber.

As a technology related to the present invention, Japanese Patent Application Laid-Open No. 2011-15604 is disclosed.

SUMMARY OF INVENTION

Problems to be Solved by the Invention

In Japanese Patent Application Laid-Open No. 2011-15604, current detection is not described. On the other hand, improvement of accuracy of current detection is desired heretofore.

An object of the present invention is to provide an indirect matrix converter that is capable of improving the accuracy of current detection.

Means for Solving the Problems

A first aspect of an indirect matrix converter according to the present invention includes: a converter (1) receiving input of an AC voltage, convert the AC voltage into a DC voltage, and apply the DC voltage between a first power line (LH) on a positive electrode side and a second power line (LL) on a negative electrode side; a snubber circuit (2) that has a capacitor (C1) provided between the first and the second power lines, and a diode (D1) connected in series with the capacitor between the first and the second power lines, and including an anode on a side close to the first power line in a series path with the capacitor; an inverter (3) converting the DC voltage into an AC voltage, and apply the AC voltage to an inductive load (8); an inverter-side current detection unit (4) detecting a current that flows through one of the first power line and the second power line between the inverter and the snubber circuit, a clamp circuit (5) that has a second capacitor (C11) provided between the first and the second power lines (LH, LL), and having a larger electrostatic capacity than that of the capacitor (C1), and a second diode (D11) connected in series with the second capacitor between the first and the second power lines, and including an anode on a side close to the first power line in a series path with the second capacitor; and a converter-side current detection unit (6) provided between the clamp circuit and the converter (1), and detecting a current that flows through the second power line, wherein a series connection body of the capacitor and the diode (D1) has one end that is connected to the first power line between the clamp circuit and the inverter, and another end that is connected to the second power line on a side closer to the converter than the converter-side current detection unit.

A second aspect of the indirect matrix converter according to the present invention is the indirect matrix converter according to the first aspect, wherein the converter-side current detection unit (6) detects only a current that flows through the second power line (LL) along a direction from the clamp circuit (5) toward the converter (1).

A third aspect of the indirect matrix converter according to the present invention is the indirect matrix converter according to first or second aspect, wherein the snubber circuit (2) further includes a resistor (R1) connected in parallel with the capacitor (C1).

Effects of the Invention

According to the first and fourth aspects of the indirect matrix converter according to the present invention, the inverter-side current detection unit detects the current that flows through the first or second power line between the snubber circuit and the inverter. Accordingly, the inverter-side current detection unit does not detect a current that flows from the converter to the converter via the first wire line, the snubber circuit, and the second power line. Such a current does not flow through the inverter, and therefore only a current that flows from the inverter (3) to the inductive load (8) can be detected with high accuracy, compared to a case where the inverter-side current detection unit is provided between the converter and the snubber circuit.

According to the second aspect of the indirect matrix converter according to the present invention, for example, a relatively large current can flow from the converter to the clamp circuit and the snubber circuit, with increase in a DC voltage outputted from the converter due to the fluctuation of an AC voltage inputted to the converter. Such a current mainly flows through the clamp circuit compared to the snubber circuit having a small electrostatic capacity. The current that flows through the clamp circuit is detected by the converter-side current detection unit, and therefore it can be detected that a large current flows through the converter. Consequently, it is possible to detect an overcurrent of the converter.

On the one hand, while a noise component resulting from the switching of the converter, or the like flows through the snubber circuit, the series connection body of the capacitor and the diode is connected to the second power line (LL) on the side closer to the converter than the converter-side current detection unit. Therefore, the converter-side current detection unit can detect a current while avoiding this noise component. Consequently, it is possible to highly accurately detect a current that flows through the converter.

On the other hand, the series connection body of the capacitor and the diode is connected to the first power line (LH) between the clamp circuit and the inverter. Thus, the series connection body is connected to the first power line on the side much closer to the inverter, and therefore it is possible to reduce wiring inductance between the inverter and the snubber circuit. Consequently, it is possible to suppress voltage rise resulting from the current and the wiring inductance in the case where the inductive load is short-circuited and a current flows from the inverter to the snubber circuit due to this short circuit, for example. Additionally, it is possible to reduce noise generation by the switching of the inverter.

According to the third aspect of the indirect matrix converter according to the present invention, a regenerative current that flows from the inverter via the snubber circuit is not detected, and therefore it is possible to further highly accurately detect the current that flows through the converter.

According to the fifth aspect of the indirect matrix converter according to the present invention, the capacitor discharges through the resistor. Therefore, it is possible to suppress increase in a voltage of the capacitor, and to suppress the application of an excessive DC voltage to the inverter.

These and other objects, features, aspects and advantages of the present invention will become more apparent from the following detailed description of the present invention when taken in conjunction with the accompanying drawings.

DESCRIPTION OF EMBODIMENTS

First Embodiment

Figure 1:
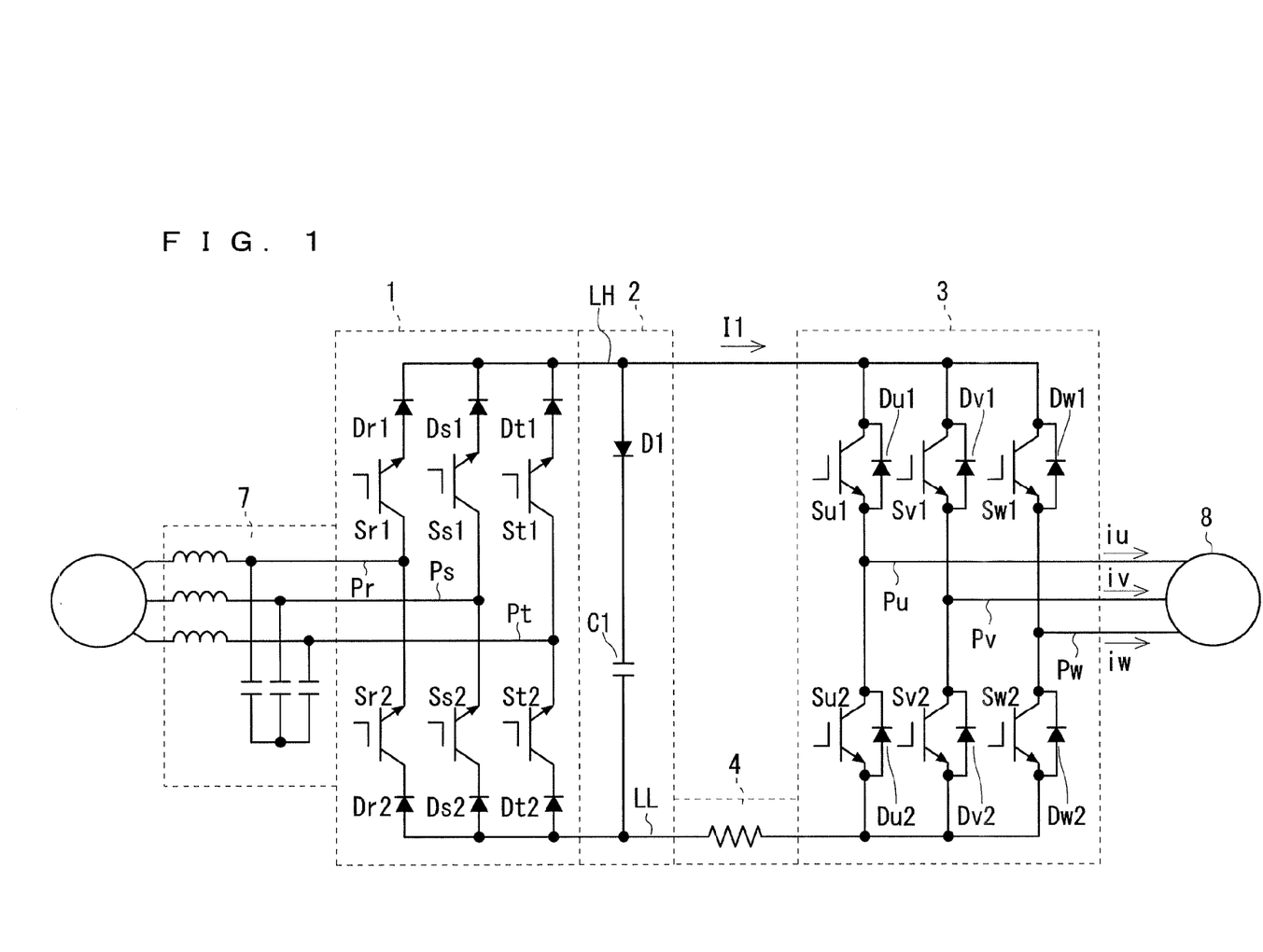
FIG. 1 is a diagram showing an example of a conceptual configuration of a power converter.

As shown in FIG. 1, this indirect matrix converter includes a current source converter 1, a snubber circuit 2, a voltage source inverter 3, and an inverter-side current detection unit 4. The converter 1 receives the input of an AC voltage through AC lines Pr, Ps and Pt, for example. The converter 1 converts the AC voltage into a DC voltage, and applies the DC voltage between power lines LH and LL. Herein, a potential applied to the power line LH is higher than a potential applied to the power line LL. It is to be noted that while three-phase converter 1 connected to the three AC lines Pr, Ps and Pt is exemplified in FIG. 1, the converter 1 is not limited to this. The converter 1 may be, for example, a single-phase converter, or may be a four or more phase converter.

In an example of the FIG. 1, the converter 1 has, for example, diodes Dr1, Dr2, Ds1, Ds2, Dt1 and Dt2, and switching elements Sr1, Sr2, Ss1, Ss2, St1 and St2.

The switching elements Sx1 and Sx2 (hereinafter, x represents r, s and t) are, for example, an insulated gate bipolar transistor, etc. The diode Dx1 and the switching element Sx1 are connected in series with each other between the AC line Px and the power line LH. The diode Dx1 has a cathode disposed toward the power line LH. That is, the diodes Dr1, Ds1 and Dt1 prevent a current from flowing from the power line LH to the AC lines Pr, Ps and Pt through the switching elements Sr1, Ss1 and St1, respectively.

The diode Dx2 and the switching element Sx2 are connected in series with each other between the AC line Px and the power line LL. The diode Dx2 has an anode disposed toward the power line LL. That is, the diodes Dr2, Ds2 and Dt2 prevent a current from flowing from the AC lines Pr, Ps and Pt to the power line LL through the switching elements Sr2, Ss2 and St2, respectively.

These switching elements Sx1 and Sx2 are suitably controlled by a controller (not shown). For example, the switching elements Sx1 and Sx2 are controlled on the basis of an AC voltage applied to the AC line Px. Consequently, the converter 1 can convert the AC voltages applied to the AC lines Pr, Ps and Pt into DC voltages, and apply the DC voltages between the power lines LH and LL. Such control is a well-known technology, and therefore detailed description thereof will be omitted.

In the example of FIG. 1, the switching elements Sx1 and Sx2 and the diodes Dx1 and Dx2 are provided. However, the present invention is not necessarily limited to this. For example, in place of a pair of the diode Dx1 and the switching element Sx2 and/or a pair of the diode Dx2 and the switching element Sx2, a reverse blocking switching element excellent in resistance to a reverse voltage (such as RB-IGBT (reverse blocking insulated gate bipolar transistor)) may be employed.

The snubber circuit 2 includes a diode D1 and a capacitor C1 that are provided between the converter 1 and the inverter 3. The capacitor C1 is, for example, a ceramic capacitor, and is provided between the power lines LH and LL. The diode D1 is connected in series with the capacitor C1 between the power lines LH and LL, and has an anode on a side close to the power line LH. The diode D1 prevents the capacitor C1 from discharging toward the power line LH.

The inverter 3 is, for example, a three-phase inverter, and converts the DC voltage between the power lines LH and LL into an AC voltage, and applies this to an inductive load 8. The inverter 3 includes, for example, switching elements Su1, Sv1, Sw1, Su2, Sv2 and Sw2, and diodes Du1, Dv1, Dw1, Du2, Dv2 and Dw2. The switching elements Sy1 and Sy2 (y represents u, v and w) are, for example, an insulated gate bipolar transistor, etc. The switching elements Sy1 and Sy2 are connected in series with each other between the power lines LH and LL. The AC line Py is drawn out from a connecting point which connects the switching elements Sy1 and Sy2. The diodes Dy1 and Dy2 are connected in parallel with the switching elements Sy1 and Sy2, respectively, and anodes of the diodes Dy1 and Dy2 are provided toward the power line LL.

These switching elements Sy1 and Sy2 are suitably controlled by a controller (not shown). By this control, the inverter 3 can convert the DC voltage between the power lines LH and LL into an AC voltage, and apply this to the AC lines Pu, Pv and Pw. Such control is a well-known technology, and therefore detailed description thereof will be omitted.

The inductive load 8 is, for example, a motor, and is driven in accordance with the AC voltage applied from the inverter 3.

In the example of FIG. 1, a filter 7 is provided on an input side of the converter 1. For example, the filter 7 includes a reactor provided on each of the AC lines Pr, Ps and Pt, and a capacitor provided among the AC lines Pr, Ps and Pt. The capacitor is provided between the reactor and the converter 1. In the example of FIG. 1, these capacitors are connected to each other with star connection. This filter 7 suppresses a current/voltage of a harmonic component by the switching of the converter 1, for example. This enables a smooth waveform of an input current. On the other hand, in the case where it is allowed that an input current that flows through the AC lines Pr, Ps and Pt includes many harmonic components, the filter 7 is not an essential requirement.

In this indirect matrix converter, while the capacitor C1 is provided between the power lines LH and LL, the capacitor C1 functions as a snubber capacitor having a small electrostatic capacity, and does not function as a smoothing capacitor. In the normal operation of the inductive load 8, a current from the converter 1 flows to the inverter 3 through the power line LH, and flows from the inverter 3 to the converter 1 via the power line LL. Accordingly, in the normal operation of the inductive load 8, a current ideally does not flow through the snubber circuit 2, and the current that flows through the converter 1 and the current that flows through the inverter 3 are equal to each other.

On the other hand, for example, in the following case, a current flows through the snubber circuit 2. That is, for example, in the case where a regenerative current from the inverter 3 is generated, a current flows through the snubber circuit 2. This regenerative current cannot flow through the converter 1 because of the blocking by the diodes Dx1 and Dx2, and flows through the snubber circuit 2 from the power line LH to the power line LL. There is another case in which a DC voltage outputted by the converter 1 exceeds voltage between the both ends of the capacitor C1 due to the fluctuation of an AC voltage inputted to the converter 1, for example. In such a case, a current flows from the converter 1 to the snubber circuit 2. Additionally, for example, a noise current resulting from the switching of the inverter 3 also can flow through the snubber circuit 2.

In the present embodiment, the inverter-side current detection unit 4 detects a current that flows through the power line LH or the power line LL between the snubber circuit 2 and the inverter 3. In the example of FIG. 1, the inverter-side current detection unit 4 detects the current of the power line LL. Additionally, in the example of FIG. 1, a shunt resistor is shown as a component that belongs to the inverter-side current detection unit 4. However, the shunt resistor does not necessarily need to be used, and a current may be detected by an arbitrary method.

The inverter-side current detection unit 4 detects the current that flows through the power line LH or the power line LL between the snubber circuit 2 and the inverter 3, and therefore does not detect a current that flows from the converter 1 to the converter 1 via the power line LH, the snubber circuit 2, and the power line LL. This current does not pass through the inverter 3, and therefore the inverter-side current detection unit 4 can highly accurately detect the current that flows through the inverter 3, compared to a case where the inverter-side current detection unit 4 detects a current that flows through the power lines LH and LL between the converter 1 and the snubber circuit 2.

The current detected by the inverter-side current detection unit 4 can be detected as line currents iu, iv and iw that flow through the AC lines Pu, Pv and Pw on the basis of a switching pattern of the inverter 3. While such line current detection is a well-known technology, and therefore detailed description thereof is omitted, an example thereof will be briefly described. For example, in a switching pattern in which switching elements Su1, Sv2 and Sw2 is made conductive, the line current iu flows through the AC line Pu from the power line LH via the switching element Su1, and currents branched in the inductive load 8 join the power line LL from the AC lines Pv and Pw via the switching elements Sv2 and Sw2. Accordingly, in this switching pattern, the current that flows through the power line LL coincides with the line current iu. Therefore, when this switching pattern is employed, the current detected by the inverter-side current detection unit 4 can be detected as the line current iu. The line currents iv and iw are similarly detected.

In the present embodiment, it is possible to detect a current with high accuracy, and therefore it is possible to detect a line current with high accuracy. Such a line current can be used for the control of an inverter. Accordingly, the high accurate detection of the current (iu, iv, w) that flows through the inductive load 8 contributes to the suitable control of the inverter.

Second Embodiment

Figure 2:
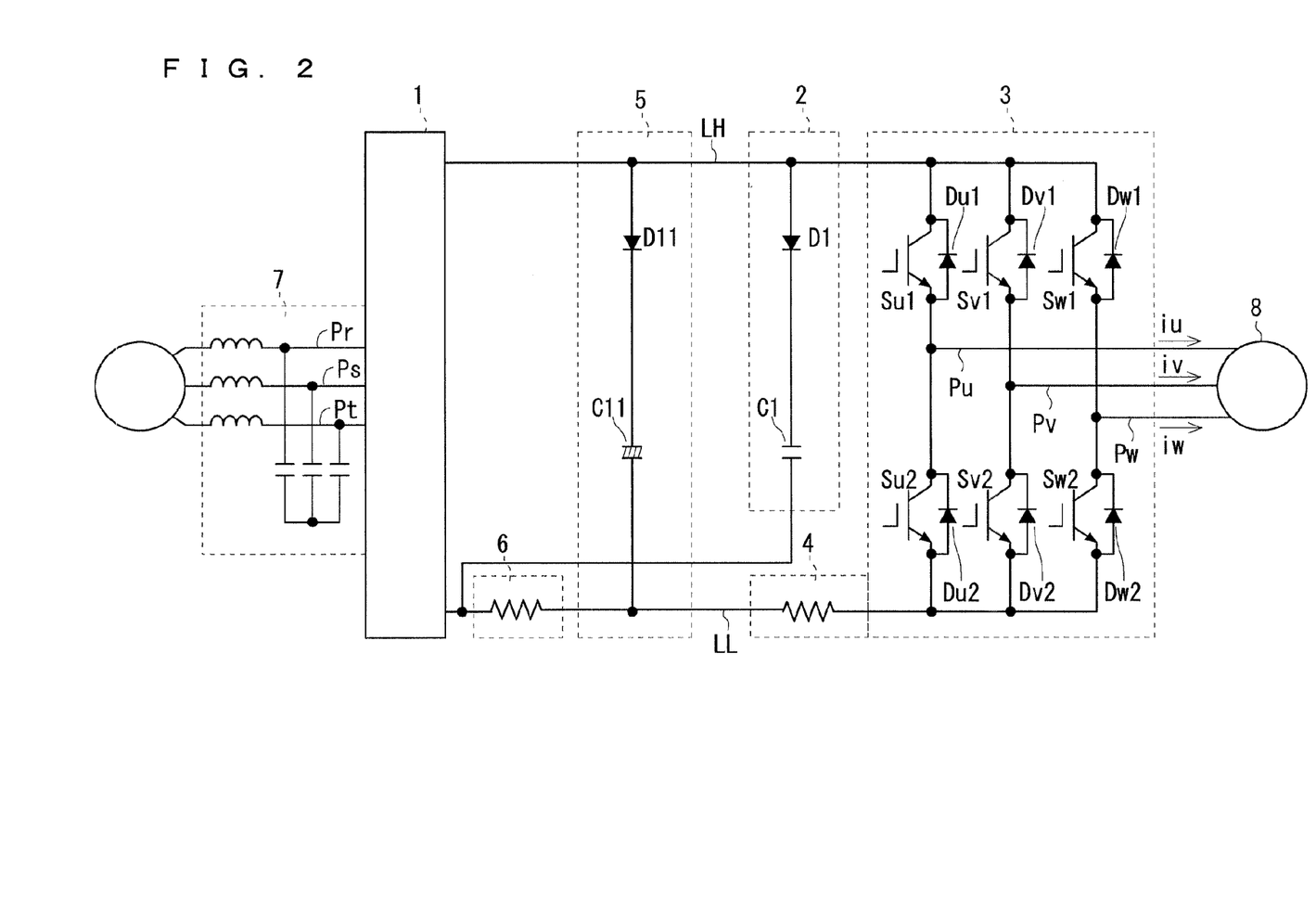
FIG. 2 is a diagram showing an example of the conceptual configuration of the power converter.

An indirect matrix converter of FIG. 2 further includes a clamp circuit 5 and a converter-side current detection unit 6 compared to the indirect matrix converter of FIG. 1. The clamp circuit 5 includes a diode D11 and a capacitor C11. The capacitor C11 is provided between power lines LH and LL, and has a larger electrostatic capacity than the electrostatic capacity of a capacitor C1. Additionally, impedance in a harmonic area of the capacitor C11 is larger than impedance in a harmonic area of the capacitor C1. The capacitor C11 is, for example, an electrolytic capacitor, and the capacitor C1 is, for example, a film capacitor. A diode D11 is connected in series with the capacitor C11 between the power lines LH and LL, and has an anode on a side close to the power line LH in a series path with the capacitor C11. The diode D11 prevents the capacitor C11 from discharging toward the power line LH.

The converter-side current detection unit 6 detects a current that flows through the power line LL between the converter 1 and the clamp circuit 5. In an example of FIG. 2, a shunt resistor is shown as a component that belongs to the converter-side current detection unit 6. However, the shunt resistor does not necessarily need to be used, and a current may be detected by an arbitrary method.

An end of a series connection body of a diode D1 and the capacitor C1 that belong to the snubber circuit 2 is connected to the power line LH between the clamp circuit 5 and an inverter 3. This enables reduction in wiring inductance between the end and the inverter 3, compared to a structure in which the end is connected to the power line LH on a side closer to the converter 1 than the clamp circuit 5.

In a case where at least any two of the AC lines Pu, Pv and Pw are short-circuited, the increase rates (di/dt) of both power running/regenerative currents to time become the highest. At this time, voltage rise (L·di/dt) resulting from the regenerative current and the wiring inductance becomes the highest. In this Second Embodiment, as described above, the wiring inductance can be reduced, and the snubber circuit 2 can absorb a larger amount of momentary overcurrent than the clamp circuit 5. Therefore, this voltage rise is easily suppressed.

On the other hand, the other end of the series connection body of the diode D1 and the capacitor C1 is connected to the power line LL on a side closer to the converter 1 than the converter-side current detection unit 6. In other word, the converter-side current detection unit 6 detects a current that flows through the power line LL between the snubber circuit 2 and the clamp circuit 5. Accordingly, the converter-side current detection unit 6 does not detect a current that flows through the power line LL to the converter 1 via the snubber circuit 2.

A regenerative current flows through the snubber circuit 2, and therefore the converter-side current detection unit 6 can detect the regenerative current. However, when the regenerative current flows, the current ideally does not flow through the converter 1. This is because both end voltages of the capacitors C1 and C11 become higher than a maximum value of an AC voltage (line voltage) inputted to the converter 1. Accordingly, it can be determined that a current which flows through the converter is zero with detection of a regenerative current by the converter-side current detection unit 6.

It is to be noted that the converter-side current detection unit 6 may detect only a current that flows through the power line LL along a direction from the clamp circuit 5 toward the converter 1. Consequently, a regenerative current is not detected as a current that flows through the converter 1.

Similarly to First Embodiment, a relatively large current can flow from the converter 1 via the power line LH, the clamp circuit 5, the snubber circuit 2, and the power line LL, due to the fluctuation of an AC voltage inputted to the converter 1, for example. However, the electrostatic capacity of the capacitor C11 that belongs to the clamp circuit 5 is larger than the electrostatic capacity of the capacitor C1 that belongs to the snubber circuit 2, for example, 10 times or more. Accordingly, such a current mainly passes through the clamp circuit 5. Therefore, even when the converter-side current detection unit 6 does not detect a current that flows via the snubber circuit 2, the converter-side current detection unit 6 can detect a current that flows via the clamp circuit 5. Accordingly, it is possible to detect that a large current is generated in the converter 1.

On the other hand, the impedance in the harmonic area of the capacitor C1 is smaller than the impedance in the harmonic area of the capacitor C11. It is to be noted that the impedance in the harmonic area mentioned herein is, for example, impedance in a high harmonic component that is higher than a minimum value of a switching frequency of the inverter 3. Alternatively, for example, in the case where a switching signal to the inverter 3 is generated by the comparison of a predetermined carrier with a command value, the impedance may be impedance in a higher harmonic component than a frequency of the carrier.

Thus, the impedance in the harmonic component of the capacitor C1 is smaller than the impedance in the harmonic component of the capacitor C11, and therefore a harmonic component (hereinafter, referred to as a noise current) such as noise resulting from the switching of the inverter 3 flows through the snubber circuit 2 more preferentially than the clamp circuit 5. More specifically, a current according to an inductance component of the power line LH between the filter 7 and the inverter 3 flows through the snubber circuit 2 as switching noise, due to the switching of the inverter 3. Accordingly, the noise current sometimes flows from the filter 7, the converter 1 and the power line LH to the power line LL, the converter 1 and the filter 7 through the snubber circuit 2, or the noise current sometimes flows from the inverter 3 and the power line LH to the power line LL and the inverter 3 through the snubber circuit 2.

On the power line LH side, the converter 1 and the clamp circuit 5 are provided between the filter 7 and the snubber circuit 2. Accordingly, an inductance component between the filter 7 and the snubber circuit 2 is larger than inductance component between the snubber circuit 2 and the inverter 3. Therefore, a noise current that flows into the snubber circuit 2 from the clamp circuit 5 is larger than a noise current that flows into the snubber circuit 2 from the inverter 3.

In Second Embodiment, the snubber circuit 2 is connected to the power line LL between the converter 1 and the converter-side current detection unit 6. Therefore, while a noise current that flows into the snubber circuit 2 from the inverter 3 flows through the converter-side current detection unit 6, a noise current that flows into the snubber circuit 2 from the clamp circuit 5 does not flow through the converter-side current detection unit 6. As described above, the noise current from the inverter 3 is relatively small, and therefore the converter-side current detection unit 6 can detect a current that flows through the converter 1 with relatively high accuracy.

<Snubber Circuit>

Figure 3:
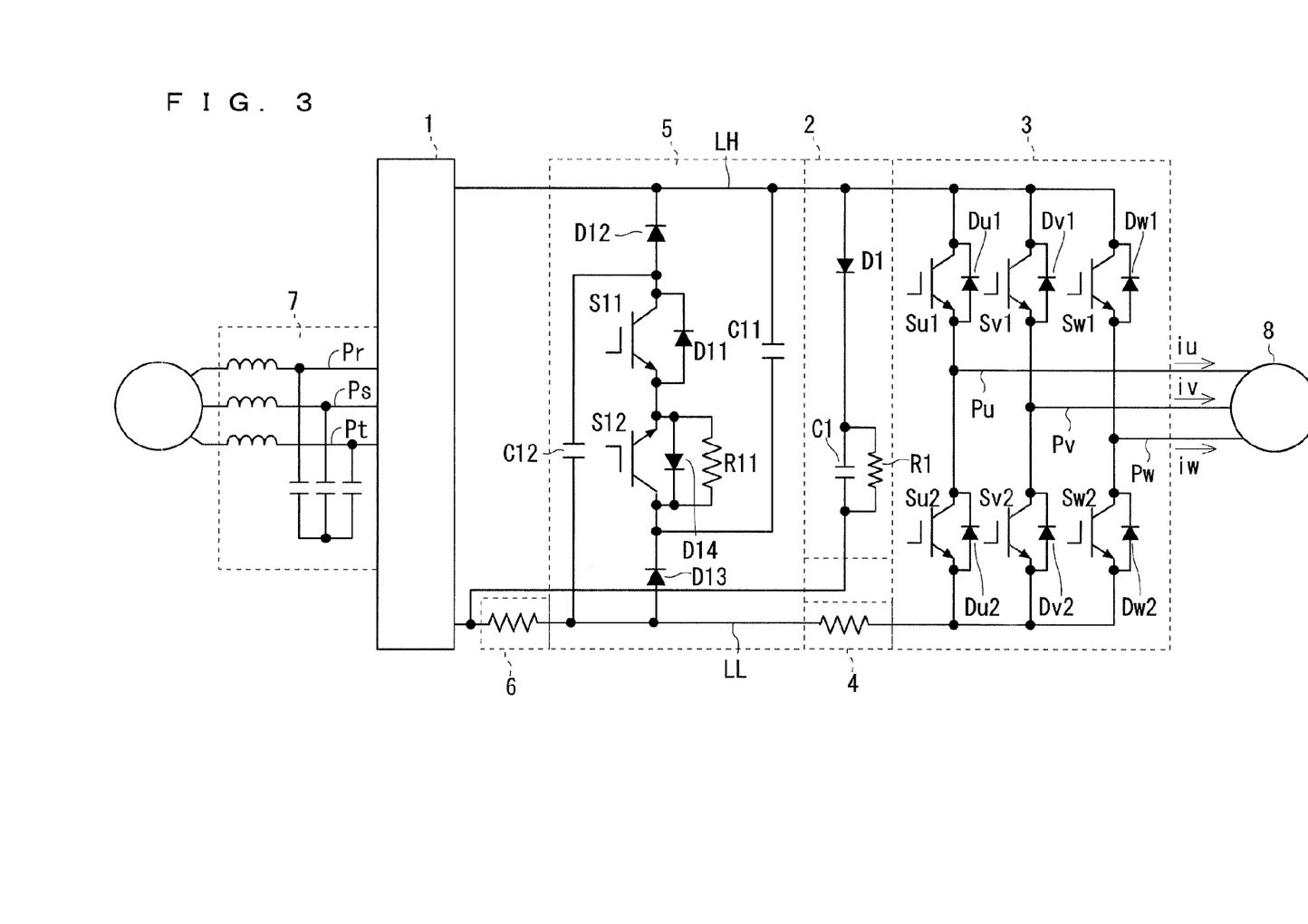
FIG. 3 is a diagram showing an example of the conceptual configuration of the power converter.

In an example of FIG. 3, a snubber circuit 2 further includes a resistor R1. The resistor R1 is connected in parallel with a capacitor C1. Accordingly, the capacitor C1 can discharge via the resistor R1. Therefore, it is possible to suppress increase in a voltage of the capacitor C1, and absorbing power of a high frequency current is also improved.

On the other hand, when the capacitor C1 discharges, and the voltage of the capacitor C1 becomes smaller than a DC voltage output by a converter 1, a current flows through the snubber circuit 2 from the converter 1 via the power line LH. For example, when the converter 1 applies a DC voltage between power lines LH and LL in the following manner, this current easily periodically flows. That is, the converter 1 alternately switches a maximum phase line voltage that is the largest among input line voltages, and an intermediate phase line voltage that is the second largest, and outputs the voltage as the DC voltage. Therefore, when the DC voltage is switched from the intermediate phase line voltage to the maximum phase line voltage, this DC voltage relatively steeply increases. Accordingly, at the time of this switching, the DC voltage easily exceeds the voltage of the capacitor C1, and therefore this current easily flows. However, even when such a current flows through the snubber circuit 2, the current is not detected by the inverter-side current detection unit 4 and the converter-side current detection unit 6. Accordingly, the inverter-side current detection unit 4 can highly accurately detect a current that flows through the inverter 3. This content is also applied to a case where the snubber circuit 2 has a resistor R1 in First Embodiment.

<Clamp Circuit>

A clamp circuit 5 exemplified in FIG. 3 further includes a capacitor C12, and diodes D12 and D13, compared to the clamp circuit 5 of FIG. 2. A diode D11 and capacitors C11 and C12 are connected in series with each other between power lines LH and LL. In the series path, the diode D11 has an anode on a side close to the power line LH, and is provided between the capacitors C11 and C12. Additionally, in the series path, the capacitor C11 is provided on a side close to the power line LH with respect to the diode D11. The diode D13 is provided between a connecting point between the capacitor C11 and the diode D11, and the power line LL. The diode D13 has an anode on a side close to the power line LL. The diode D12 is provided between a connecting point between the capacitor C12 and the diode D11, and the power line LH. The diode D12 has a cathode on a side close to the power line LH.

The clamp circuit 5 of FIG. 3 further includes switch elements S11 and S12, a resistor R11, and a diode D14. The switch element S11 is connected in parallel with the diode D11. The resistor R11 is connected in series with the diode D11 between the capacitors C11 and C12 in a series path of the capacitors C11 and C12 and the diode D11. Additionally, a series body of the diode D11 and the resistor R11 is disposed between the diodes D12 and D13. The switch element S12 is, for example, an insulated gate bipolar transistor, and is connected in parallel with the resistor R11.

When the switch elements S11 and S12 are made nonconductive by the clamp circuit 5, the capacitors C11 and C12 are charged while being connected in series with each other, and discharges while being connected in parallel with each other. According to such a clamp circuit 5, for example, capacitors C11 and C12 can perform charge and discharge in accordance with a load power factor of the inductive load 8, as described in Japanese Patent Application Laid-Open No. 2011-15604. However, even the clamp circuit 5 of FIG. 3 increases a DC voltage, when the load power factor reduces. Accordingly, also in the clamp circuit 5 of FIG. 3, in the case where the switch elements S11 and S12 are made conductive with a regenerative current larger than a predetermined Iref1 as a trigger, the capacitors C11 and C12 can discharge when a power running current flows. Therefore, it is possible to suppress increase in a DC voltage.

The resistor R11 is present in a charge path of the capacitors C11 and C12, namely the above series path, and therefore it is possible to reduce an inrush current that flows through the capacitors C11 and C12 when the capacitors C11 and C12 are charged, for example. For example, also when AC voltages applied to the AC lines Pr, Ps and Pt are instantaneously reduces and thereafter recovers, the inrush current can flow to the capacitors C11 and C12. However, the resistor R11 can reduce this inrush current. On the other hand, in the case where a regenerative current flows to the capacitors C11 and C12, a DC voltage between the power lines LH and LL increases by an amount of voltage drop in the resistor R11. Accordingly, the switch element S12 is also made conductive with the regenerative current larger than the predetermined Iref1 as a trigger. Consequently, the regenerative current flows while avoiding the resistor R11, and therefore it is possible to avoid increase in a DC voltage due to the voltage drop of the resistor R1. Additionally, the resistor R11 is short-circuited, so that a current does not flow through the resistor R11. Therefore, it is possible to suppress the heat generation of the resistor R11, and to minimize the power capacity of the resistor R11.

The diode D14 has an anode on a side close to the power line LL in the charge path of the capacitors C11 and C12. This is because a case where the switch element S12 does not allow a current to flow in a forward direction of the diode D14 is assumed. That is, in order to make the capacitors C11 and C12 to function as smoothing capacitors, it is necessary to bidirectionally perform the charge and discharge of the capacitors C11 and C12. However, in the example of FIG. 3, the switch element S12 is made conductive only in one direction, and therefore the switch element S12 can be made conductive also in a reverse direction by the diode D14. Accordingly, for example, when the switch element S12 is a bidirectional switch, the diode D14 is unnecessary.

It is to be noted that in the normal operation of the inductive load 8, the switch element S12 should be made non-conductive. The reason of this is as follows. That is, for example, a DC voltage from the converter 1 sometimes exceeds a both end voltage of a pair of the capacitors C11 and C12 due to the fluctuation of the AC voltages of the AC line Pr, Ps and Pt, as described in Japanese Patent Application Laid-Open No. 2011-15604. In this case, a large current flows through the capacitors C11 and C12, and there is a possibility of overcurrent stop. However, the resistor R11 can reduce such a current.

Figure 4:
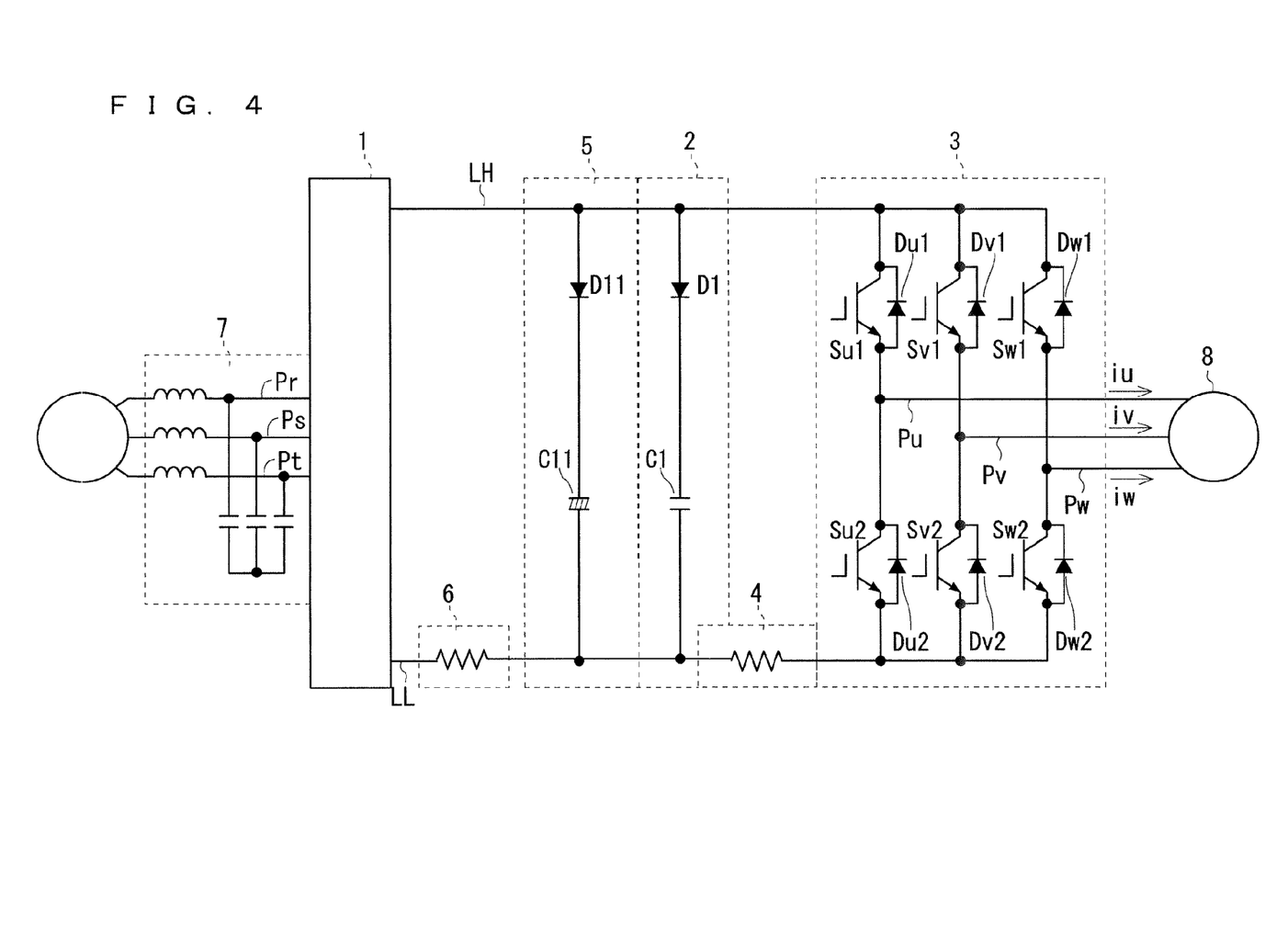
FIG. 4 is a diagram showing an example of the conceptual configuration of the power converter.

As exemplified in FIG. 4, a snubber circuit 2 may be connected to a power line LL between an inverter-side current detection unit 4 and a converter-side current detection unit 6. Even in this case, similarly to First Embodiment, a current that flows through the snubber circuit 2 from a converter 1 does not flow through the inverter-side current detection unit 4. Accordingly, it is possible to bring effects similar to those of First Embodiment. In addition, a regenerative current from the inverter 3 flows while avoiding the converter-side current detection unit 6. Accordingly, for example, it is possible to suppress the heat generation of the shunt resistor of the converter-side current detection unit 6 due to the regenerative current. Additionally, the rise of a DC voltage when the regenerative current flows can be suppressed by an amount of the shunt resistor, and an amount of the inductance component between the inverter-side current detection unit 4 and the converter-side current detection unit 6.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SIGNS 1 converter
2 snubber circuit
3 inverter
4 inverter-side current detection unit
5 clamp circuit
6 converter-side current detection unit
C1, C11 capacitor
D1, D11 diode
LH, LL power line
R1 resistor

The invention claimed is:

1. An indirect matrix converter comprising:
a converter receiving input of an AC voltage, converting said AC voltage into a DC voltage, and applying said DC voltage between a first power line on a positive electrode side and a second power line on a negative electrode side;
a snubber circuit that has a diode connected in series with a capacitor between said first and said second power lines, said diode having a first forward direction from said first power line to said second power line in a first series path with said capacitor;
an inverter converting said DC voltage into an AC voltage, and applying said AC voltage to an inductive load;
an inverter-side current detection unit detecting a current that flows through one of said first power line and said second power line between said inverter and said snubber circuit;
a clamp circuit that has a second diode connected in series with a second capacitor between said first and said second power lines, said second capacitor having a larger electrostatic capacity than that of said capacitor, and said second diode having a second forward direction from said first power line to said second power line in a second series path with said second capacitor; and
a converter-side current detection unit provided between said clamp circuit and said converter, and detecting a second current that flows through said second power line, wherein
wherein a series connection body of said capacitor and said diode has one end that is connected to said first power line between said clamp circuit and said inverter, and another end that is connected to said second power line between said converter and said clamp circuit such that a noise current that flows into the snubber circuit from the clamp circuit does not flow through the converter-side current detection unit.

2. The indirect matrix converter according to claim 1, wherein said converter-side current detection unit detects only a current that flows through said second power line along a direction from said clamp circuit toward said converter.

3. The indirect matrix converter according to claim 1, wherein said snubber circuit further includes a resistor connected in parallel with said capacitor.

4. The indirect matrix converter according to claim 2, wherein said snubber circuit further includes a resistor connected in parallel with said capacitor.

* * * * *